United States Patent
Wilms

(10) Patent No.: US 6,331,065 B1
(45) Date of Patent: Dec. 18, 2001

(54) SLIDING HEADLINER IN A VEHICLE

(75) Inventor: Bernd Wilms, Holzgerlingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/482,208

(22) Filed: Jan. 12, 2000

(30) Foreign Application Priority Data

Jan. 21, 1999 (DE) .............................................. 199 02 244

(51) Int. Cl.⁷ ................................................ F21W 101/02
(52) U.S. Cl. ............................ 362/493; 362/490; 362/84
(58) Field of Search .................... 362/490, 493, 362/488, 84

(56) References Cited

U.S. PATENT DOCUMENTS 4,864,473 * 9/1989 Tokarz et al. ........................ 362/490
5,079,675    1/1992 Nakayama ............................... 362/31
5,091,831 * 2/1992 Van Order et al. .................... 362/490

FOREIGN PATENT DOCUMENTS

| 19511066 | 11/1996 | (DE) . |
| 19533778 | 3/1997 | (DE) . |
| 19852593 | 5/2000 | (DE) . |

* cited by examiner

Primary Examiner—Laura K. Tso
(74) Attorney, Agent, or Firm—Crowell & Moring LLP

(57) ABSTRACT

A sliding headliner for closing the region below a transparent roof element, in particular a glass sliding roof, in a roofliner is provided. It is provided according to the invention that a surface-lighting unit is arranged on the sliding headliner on the inside

11 Claims, 2 Drawing Sheets

SLIDING HEADLINER IN A VEHICLE

CROSS REFERENCE TO RELATED APPLICATION

Priority is claimed with respect to German Application No. 199 02 244.5-21 filed in Germany on Jan. 21, 1999, the disclosure of which is incorporated herein by reference.

BACKGROUND OF THE INVENTION

1. Technical Field

The invention relates to a sliding headliner for closing the region below a transparent roof element in a roofliner of a vehicle.

2. Discussion

A sliding headliner of the generic type for closing the region below a transparent roof element in a roofliner is known from DE 19511066 C1. The vehicle roof has a transparent roof element and a sliding headliner for selective opening and closing of the region below the transparent roof element. The transparent roof element can be a sliding roof or a glass roof, for example. In order to close the region below the transparent roof element, the sliding headliner covers the entire area of the roof element and prevents the intrusion of light beams into the interior of the vehicle. Strong insolation is thereby prevented in the vehicle interior.

A surface-lighting unit is additionally arranged in the vehicle in order to illuminate the interior of the vehicle in the event of darkness. Owing to the illumination of a large area, surface-lighting units have a lesser tendency to cast shadows than do punctiform lighting units. A special design of a surface-lighting unit is known from U.S. Pat. No. 5,079,675. The surface-lighting unit has a uniform light distribution over a surface and serves to illuminate an object or a space. The surface-lighting unit has at least one pane, there being arranged on at least one side of the pane a light source around which a reflecting member is arranged which reflects the light into the pane. Provided in the pane are inclined reflecting surfaces which reflect light incident in parallel by an angle of 90° so that the light is emitted directionally in a preferred direction. Arranged on the opposite side of the preferred direction of the transparent pane is a reflecting pane which reflects the light falling thereupon in the desired emitting direction, with the result that a uniform and intensive light emission is achieved in one direction.

With this type of roofliner, it is disadvantageous that when the transparent roof element with a sliding headliner is closed in order to avoid incident light in the motor vehicle or to shade the interior, a large region of the inside of the vehicle roof is covered with the sliding headliner. There is little space for additionally accommodating a lighting unit, particularly a surface-lighting unit on the roofliner.

SUMMARY OF THE INVENTION

The object of the invention is to develop a sliding headliner for closing the region below a transparent roof element so as to produce optimum illumination of the vehicle interior in the case of darkness, in particular.

A substantial advantage of these refinements resides in that owing to the arrangement of the surface-lighting unit on the sliding headliner there is no need for additional space on the roofliner for the separate arrangement of the surface-lighting unit. The area of the surface-lighting unit can be reduced by inserting the sliding headliner into a holder space provided in the body of the roof. It is therefore possible to set the desired quantity of light for illuminating the interior.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The invention is explained in more detail with the aid of an exemplary embodiment in conjunction with a description of the figures. In the drawing.

DETAILED DESCRIPTION OF THE DRAWINGS

An apparatus for providing the desired illumination to the interior of a vehicle in conjunction with a sliding headliner is provided. In the following description, numerous specific details are set forth in order to provide a more comprehensive description of the present invention. It will be apparent, however, to one skilled in the art, that the present invention may be practiced without these specific details. In other instances, specific details of well-known features have not been described so as not to obscure the present invention.

Figure 1:
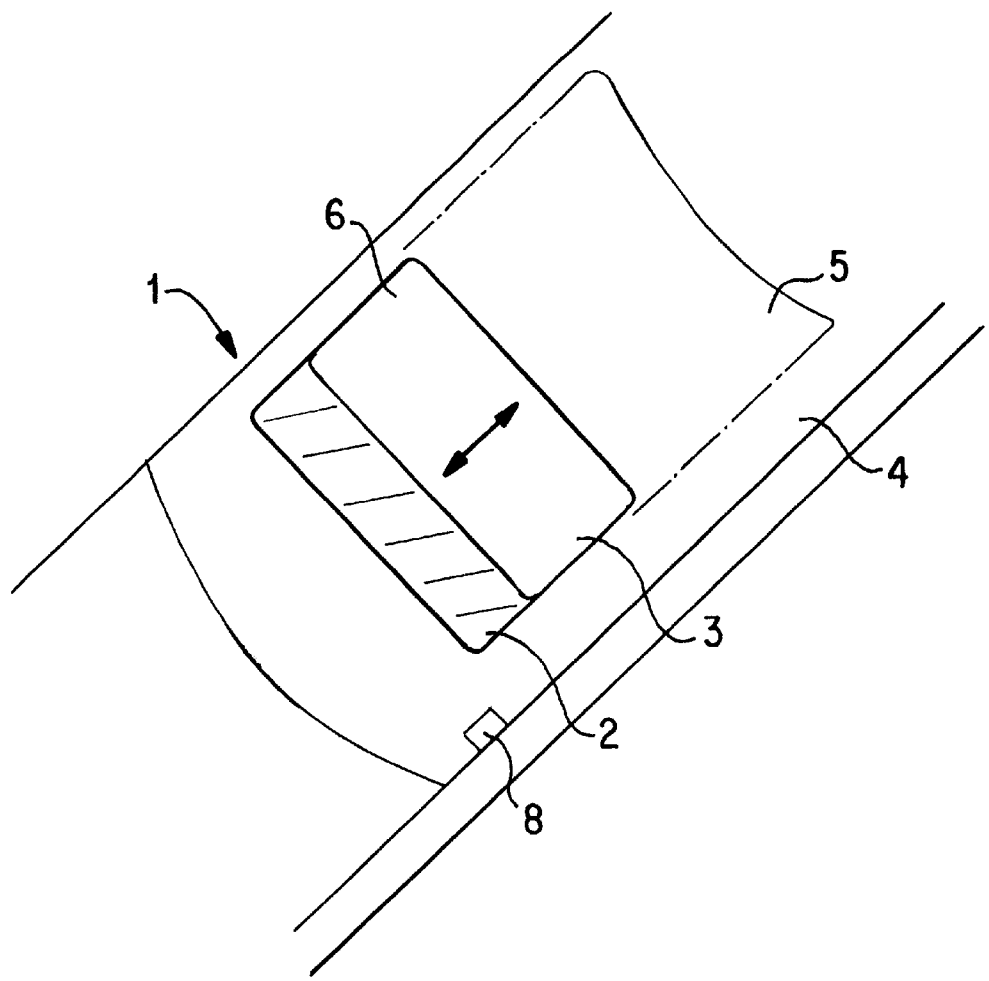
FIG. 1 shows a diagrammatic section of a roofliner.

A diagrammatic section of a roofliner 1 is represented in FIG. 1. The roofliner 1 has a transparent roof element 2, it being possible to close the region below the transparent roof element 2 with the aid of a sliding headliner 3. The transparent roof element 2 is, for example, a glass roof, or else a sliding roof made from transparent material. The sliding headliner 3 is inserted in the direction of the arrow into a holder space 5 provided in the body of the roof 4. This is performed manually or by means of an electric drive which can be controlled via a control element arranged in the interior of the vehicle. Arranged on the sliding headliner 3 on the side towards the vehicle interior is a surface-lighting unit 6 which covers a large part of the area or the entire area of the sliding headliner 3. The surface-lighting unit 6 is formed from an electroluminescent foil or from a lighting unit such as described in U.S. Pat. No. 5,079,675. However, any desired design of a surface-lighting unit is possible. The surface-lighting unit 6 also moves when the sliding headliner 3 is moved. The surface-lighting unit 6 is also inserted into the holder space 5 when the sliding headliner 3 is inserted into the holder space 5 provided in the body of the roof 4—one speaks in this case of opening the sliding headliner 3. If the sliding headliner 3 covers the entire transparent roof element 2, the entire area of the surface-lighting unit 6 can be used to illuminate the vehicle interior. The surface-lighting unit 6 is switched on by actuating a switch 8 which is preferably arranged in the vehicle interior in a way which is easily accessible to the driver or passenger. If an electric drive is provided for moving the sliding headliner 3, it is possible to provide a control mechanism which automatically closes the sliding headliner 3 and automatically switches on the surface-lighting unit 6 upon opening the vehicle. Provided in the vehicle is a suitable control element with the aid of which the sliding headliner 3 can be moved specifically into a desired position in the direction of arrow. The surface-lighting unit 6 cannot be put into operation until the sliding headliner 3 is completely closed or else the sliding headliner 3 can be partially open when the surface-lighting unit 6 is in operation. This second design offers the advantage that the luminosity of the surface-lighting unit 6 can be varied. In the case of a sliding headliner 3 which is a little open, the luminosity is then less than in the case of a completely closed sliding headliner 3. The surface-lighting unit 6 can also be dimmed in order to vary the luminosity.

Figure 2:
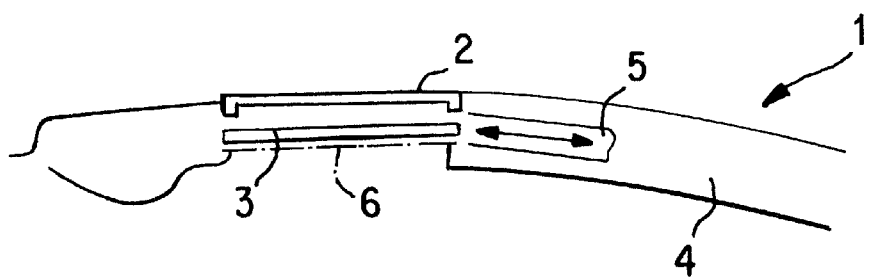
FIG. 2 shows a side view of the section of a roofliner.

FIG. 2 shows a side view of the section of a roofliner 1 represented in FIG. 1. Arranged in the body of the roof 4 is a transparent roof element 2 which can be closed on the inside of the vehicle with a sliding headliner 3. In the case of strong insolation excessive heating of the vehicle interior is avoided by the shading with the sliding headliner 3. When the sliding headliner 3 is opened, the sliding headliner 3 is inserted into a holder space 5 provided therefor in the body of the roof 4. Arranged on the sliding headliner 3 on the inside of the vehicle is a surface-lighting unit 6 which illuminates the vehicle interior when it is switched on. The surface-lighting unit 6 extends over a large part of the area of the sliding headliner 3. The surface-lighting unit 6 is moved correspondingly when the sliding headliner 3 moves, and is also inserted into the holder space 5 when the sliding headliner 3 opens.

Figure 3:
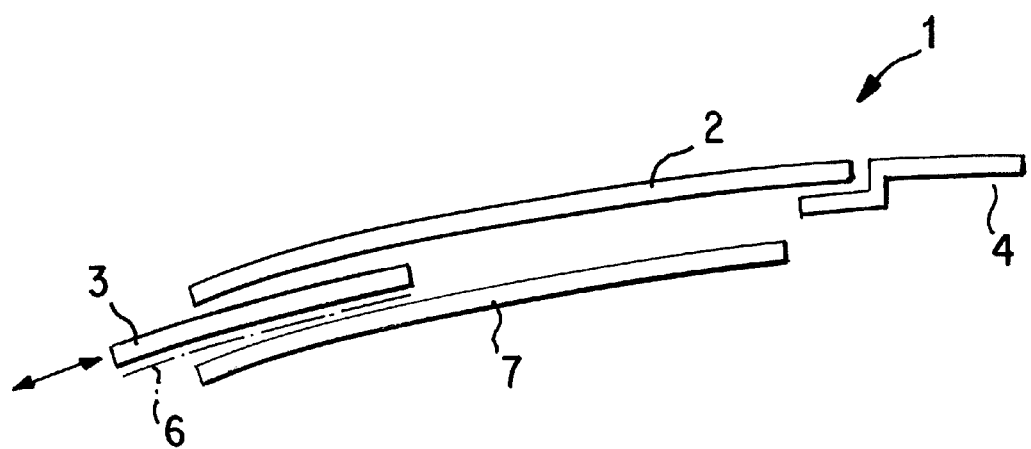
FIG. 3 shows a side view as in FIG. 2, but with a switchable pane, in addition.

FIG. 3 shows a side view as in FIG. 2, a switchable pane 7 being additionally arranged below the sliding headliner 3. The switchable pane 7 is arranged independently of the sliding headliner 3, with the result that the sliding headliner 3 can be moved with the surface-lighting unit 6 independently of the switchable pane 7. The switchable pane 7 can be switched between transparent and opaque. The changeover between these states is performed, for example, via a control element in the vehicle interior. With an open sliding headliner 3 and a transparent pane 7, light can fall through the roofliner 1 as if only the transparent roof element were present. With an open sliding headliner 3 and an opaque pane 7, the light falling through the transparent roof element 2 is partially retroreflected by the opaque pane 7. The light passes into the vehicle interior under strong scattering. In the case of a closed sliding headliner 3 with a surface-lighting unit 6 switched-on and a transparent pane 7, the light from the surface-lighting unit 6 is not changed by the pane 7. In the case of a closed sliding headliner 3 with a switched on surface-lighting unit 6 and an opaque pane 7, the light from the surface-lighting unit 6 passes into the vehicle interior under strong scattering.

The foregoing description constitutes the preferred embodiments devised by the inventors for practicing the invention. It is apparent, however, that the invention is susceptible to modification, variation and change that will be obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. A sliding headliner (3) for closing the region below a transparent roof element (2) comprising a surface-lighting unit (6) is arranged on the sliding headliner (3) on the inside of the vehicle.

2. A sliding headliner (3) according to claim 1, wherein the surface-lighting unit (6) is also moved when the sliding headliner (3) moves.

3. A sliding headliner (3) according to claim 1, wherein the surface-lighting unit (6) is turned on by actuating a switch.

4. A sliding headliner (3) according to claim 1, wherein the surface-lighting unit (6) is turned on automatically by opening the vehicle.

5. A sliding headliner (3) according to claim 1, the surface-lighting unit (6) is assigned a switchable pane (7) arranged in the roofliner (1).

6. A sliding headliner (3) according to claim 5, wherein the switchable pane (7) can be switched between transparent and opaque.

7. A headliner system for a motor vehicle having a transparent roof element, said headliner system comprising:
   a sliding headliner adapted for closing the region below the transparent roof element; and
   a surface lighting unit arranged on the side of the sliding headliner adjacent to the interior of the vehicle.

8. The headliner system as set forth in claim 1, wherein said surface lighting element is an electroluminescent foil.

9. The headliner system as set forth in claim 1, wherein said surface lighting element includes an apparatus for uniform surface light distribution capable of illuminating an object and a space.

10. In a motor vehicle having a transparent roof element and a sliding headliner adapted for closing the region below the transparent roof element, a lighting method comprising:
    controlling the artificial lighting of the vehicle interior by the position of the sliding headliner.

11. The lighting method as set forth in claim 10, further comprising the step of providing a artificial light source on the interior side of the sliding headliner.

* * * * *